United States Patent [19]
Harris

[11] Patent Number: 6,089,636
[45] Date of Patent: Jul. 18, 2000

[54] ADJUSTABLE GAME DRAG ASSEMBLY

[76] Inventor: Donald A. Harris, Rte. 2, Box 1243, New Castle, Va. 24127

[21] Appl. No.: 09/264,945

[22] Filed: Mar. 9, 1999

Related U.S. Application Data

[60] Provisional application No. 60/078,063, Mar. 16, 1998.

[51] Int. Cl.[7] .............................. A01M 31/00; B65G 7/12
[52] U.S. Cl. ......................... 294/150; 294/153; 294/165
[58] Field of Search ................................ 294/1.1, 15, 26,
294/74, 82.11, 82.14, 137, 142, 150–157,
164, 165, 167; 224/103, 921; 452/185,
187, 189, 192

[56] References Cited

U.S. PATENT DOCUMENTS

| | | | |
|---|---|---|---|
| 2,819,923 | 1/1958 | Anderson | 294/150 X |
| 2,931,629 | 4/1960 | Keller | 294/149 X |
| 3,547,456 | 12/1970 | Sapp . | |
| 3,686,710 | 8/1972 | Shankland | 294/15 X |
| 3,771,808 | 11/1973 | Duerst . | |
| 4,046,393 | 9/1977 | Vadnais . | |
| 4,132,427 | 1/1979 | McGee . | |
| 4,243,164 | 1/1981 | Burlison | 294/153 X |
| 4,283,068 | 8/1981 | Keyser . | |
| 4,335,891 | 6/1982 | Alley et al. . | |
| 4,529,240 | 7/1985 | Engel | 294/150 X |
| 4,887,823 | 12/1989 | Hallett et al. . | |
| 5,529,321 | 6/1996 | Thompson . | |
| 5,848,816 | 12/1998 | Hancock | 294/15 |
| 5,901,999 | 5/1999 | Brock | 294/153 |

*Primary Examiner*—Johnny D. Cherry
*Attorney, Agent, or Firm*—Tipton L. Randall

[57] ABSTRACT

An adjustable game drag assembly for transporting slain game animals is disclosed. The assembly includes a game engaging linear rope-like member for encircling an appendage of the game animal, and a plurality of linear rope-like handle members reversibly attachable to a connecting loop end of the game engaging section.

18 Claims, 4 Drawing Sheets

ADJUSTABLE GAME DRAG ASSEMBLY

CROSS REFERENCE TO RELATED APPLICATION

This application claims the benefit under 35 U.S.C. § 119(e) of co-pending provisional application Ser. No. 60/078,063, filed Mar. 16, 1998. Application Ser. No. 60/078,063 is hereby incorporated by reference.

FIELD OF THE INVENTION

The invention relates to a device for dragging an animal carcass from a remote site, and more particularly, to a device that is adjustable so as to perform this function in a variety of situations that may arise.

BACKGROUND OF THE INVENTION

The hunting of wild game is a popular recreational activity for a great number of people. Although small game animals are a popular quarry for hunters, it is the larger game animals, such as deer, antelope, elk, bear, sheep and the like, that receive the most attention from hunters. These large game animals often reside in remote areas. Once the quarry is taken, there is the task of transporting the carcass back to a point that is accessible with a vehicle of some type. Often the hunter must move the quarry across rough terrain to bring it to an access point. To assist in this transportation process, many hunters carry a length of rope with them during the hunt, and use the rope to drag the carcass across the terrain to the access point.

Some examples of innovative devices used for dragging animal carcasses or the like are disclosed by the following patents. Sapp, in U.S. Pat. No. 3,547,456, discloses a game transporting device including a flexible panel of slippery material fitted with both shoulder straps and hand straps used to drag a slain animal from a hunting area. A similar portable carcass skid with a single rope handle is disclosed by Duerst in U.S. Pat. No. 3,771,808. McGee, in U.S. Pat. No. 4,132,427, shows an animal carcass transporting device that includes a frame sled with hold down straps and pulling straps affixed to the front of the sled for pulling an animal secured to the sled.

Both Keyser, in U.S. Pat. No. 4,238,068, and Alley et al., in U.S. Pat. No. 4,335,891, disclose sled-like devices for transporting game animals or injured individuals. Hallett et al., in U.S. Pat. No. 4,887,823, disclose a drag reducing apparatus that is wrapped around an animal carcass to allow the carcass to slip over the terrain with minimal friction when dragged head first. A portable sled for transporting injured persons is disclosed by Vadnais in U.S. Pat. No. 4,046,393, while Thompson, in U.S. Pat. No. 5,529,321, describes a singletree draft bar for attachment to a tarpaulin used to drag yard wastes and the like.

Thus, there is an unmet need for a light weight, durable device that can be used to drag an animal carcass from a remote site to an access point from which a hunter can further transport the carcass by conventional means.

SUMMARY OF THE INVENTION

The invention is an adjustable game drag assembly for transporting slain game animals. The assembly includes a game engaging section member, comprising a linear rope-like member having a first connecting loop end, and a second snap link loop end for encircling an appendage of the game animal. A plurality of linear rope-like handle section members is fastened to the connecting loop end of the game engaging section by reversibly attachable members. Each handle section member has a first handle loop end containing a rigid hand hold member contained therein. A hunter fastens the game engaging section member around an appendage of a slain game animal by means of the second snap link loop end. The hunter transports the game animal across terrain by grasping the rigid hand hold members contained in the handle loop ends and pulling the slain animal across the terrain.

DESCRIPTION OF THE PREFERRED EMBODIMENTS

Nomenclature

10 Game Drag Assembly
   20 Game Engaging Section Member
   22 First Connecting Loop End
   24 Cable Ferrule Fastener Member
   26 Snap Link Member
   28 Game Encircling Loop End
   30 Handle Section Member
   32 Handle Loop End
   34 Rigid Hand Hold Dowel Member
   36 Aperture in Hand Hold Dowel Member
   38 Handle Fastener End
   40 Quick Link Fastener Member
   42 Threaded Quick Link Section
   C Carcass of Slain Animal Construction The game drag assembly 10 of the present invention is comprised of two individual sub-components. The primary material used for the sub-components is a rope-like material, preferably small diameter galvanized steel cable. The cable is cut to suitable length and the sub-components fabricated by means of various connectors and fasteners. All materials are commercially available at most retail hardware stores.

The construction of the game drag assembly 10 is disclosed with reference to using steel cable and metal hardware. The use of natural fibers, such as hemp and cotton, or synthetic fibers, such as nylon and polypropylene, for the rope-like material is also contemplated. It is understood that other similar materials may be employed in constructing the game drag assembly without departing from the scope of the invention.

Figure 1:
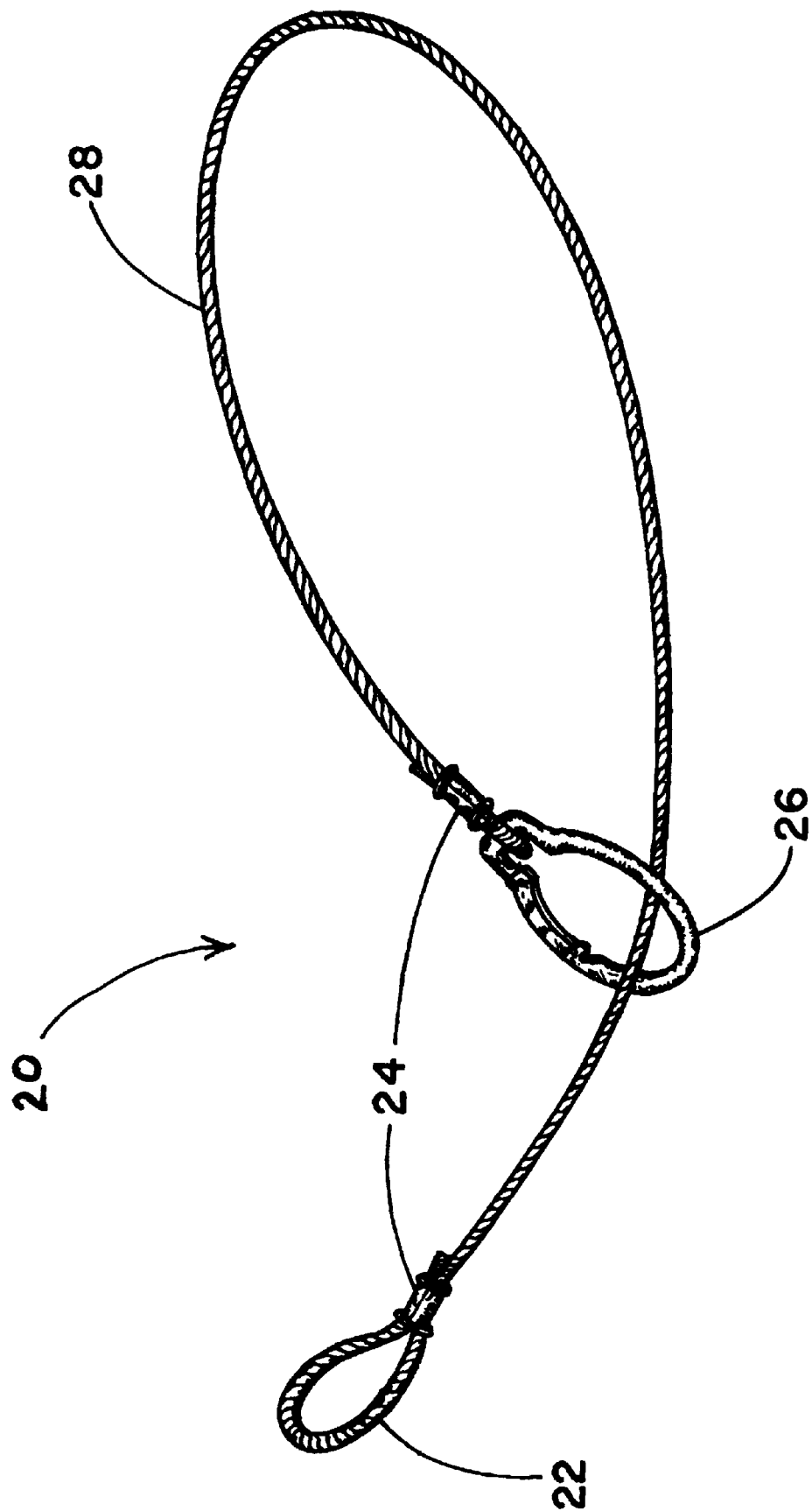
FIG. 1 is the game engaging section of the drag assembly.

One sub-component of the game drag assembly 10 is the game engaging rope-like section member 20, that is preferably fabricated from a length of small diameter steel cable. As shown in FIG. 1, a first connecting loop end 22 is formed by looping a first end of the cable on itself and securing the loop end 22 by means of a cable ferrule fastener member 24. The cable ferrule fastener member 24 is a small hollow cylindrical metal member that accepts two cable sections within the hollow interior. The ferrule fastener member 24 is crimped with a suitable tool, thus immobilizing the two cable sections within the ferrule fastener member 24, thereby producing the connecting loop end 22. At the second end of the game engaging section member 20, a snap link member 26 is secured in a small loop, again the loop formed by means of another cable ferrule fastener member 24. The snap link member 26 is generally oblong with a spring biased section that pivots opens upon applying a slight force thereto. The snap link member 26 is used to form a larger loop 28 in the game engaging section 20, with the larger loop 28 encircling the neck, legs or horns of a slain game animal.

Figure 2:
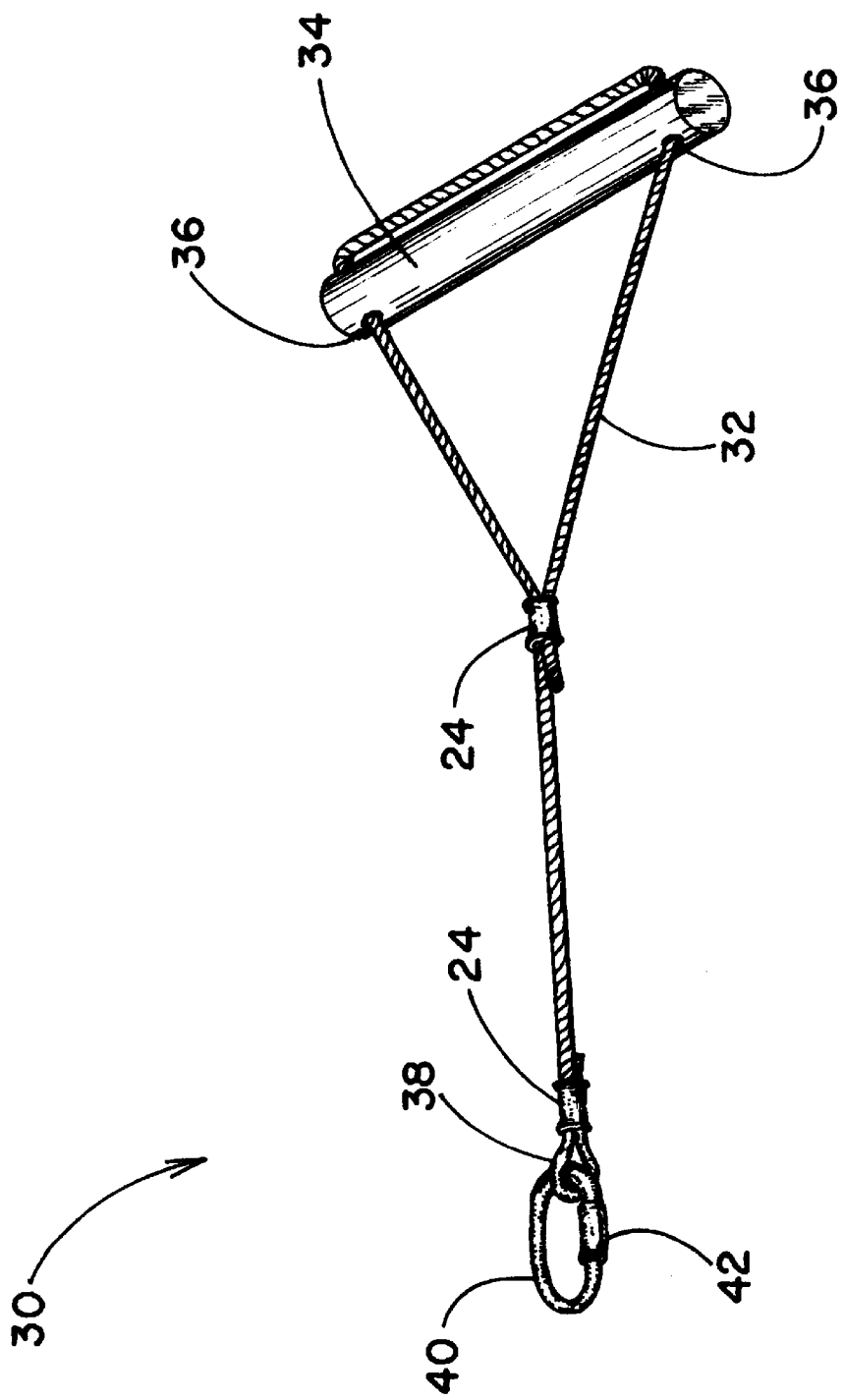
FIG. 2 is the handle section of the game drag assembly.

The other sub-component of the game drag assembly 10 is the handle section member 30, with at least two handle section members 30 present in the assembly 10. Again, the handle section member 30 is preferably fabricated from a length of small diameter steel cable. As shown in FIG. 2, a first handle section loop end 32 is formed by looping a first end of the cable on itself and securing the loop end 32 by means of another cable ferrule fastener member 24. The handle loop end 32 has a rigid hand hold member 34 secured to the handle loop end 32. Preferably, the hand hold member 34 is a short piece of wood dowel 34 having an aperture 36 near each end of the dowel 34. Other rigid material, such as metal or synthetic polymer is suitable for use as the hand hold member 34. To attach the dowel 34 to the handle loop end 32, the cable is first threaded consecutively through each aperture 36 in the dowel 34, and the handle loop end 32 is formed by means of yet another cable ferrule fastener member 24, as described above. Thus, the dowel 34 is contained in the handle loop end 32 as shown in the FIG. 2. The handle loop end 32, with rigid hand hold member 34 therein, is sufficiently large to allow an individual to grasp the rigid member 34 with one hand.

The handle section member fastener end 38 opposite the handle loop end 32 is secured to a fastener member 40, such as a quick link connector member 40, by looping the cable end through the quick link connector member 40 and securing the loop with yet another cable ferrule fastener member 24, as described above. The quick link connector member 40 has a hollow internally threaded section 42 that opens and closes the link by rotating the threaded section along an externally threaded portion (not shown) of the quick link connector member 40. The quick link connector member 40 is well known and commercially available.

Figure 3:
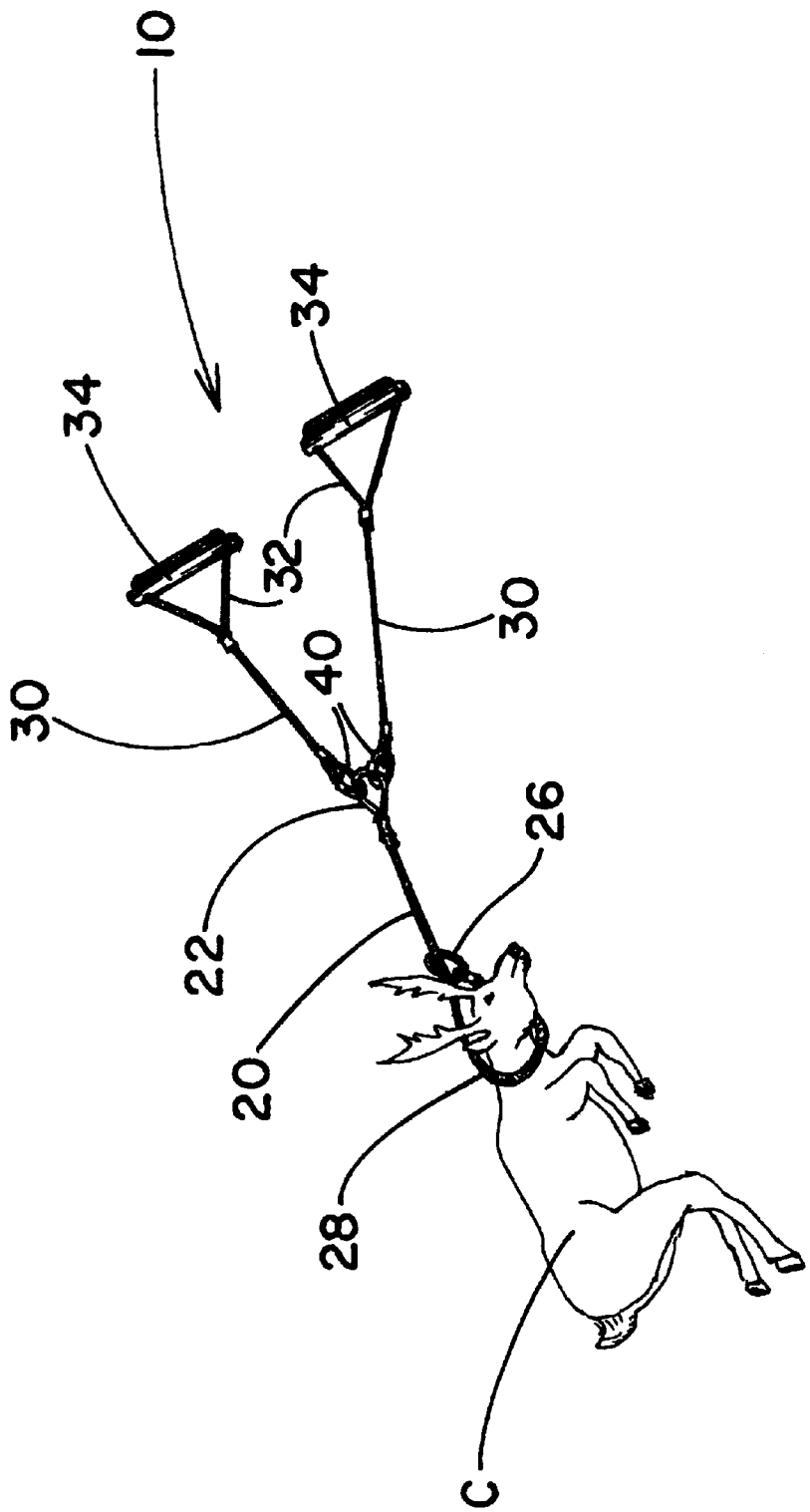
FIG. 3 is the game drag assembly secured to an animal carcass.

The game drag assembly 10 of the present invention contains at least two handle section members 30 that are reversibly attached by the quick link connector 40 to the connecting loop end 22 of the game engaging section 20. This provides at least two hand holds for one or more individuals to drag a slain game animal from one location to another. Three or four of the handle section members 30 may be employed to enable a number of hunters to drag a larger game animal carcass. FIG. 3 shows the game drag assembly 10 secured to a slain animal with two handle section members 30 fastened to the connecting loop end 22 of the game engaging section member 20.

Figure 4:
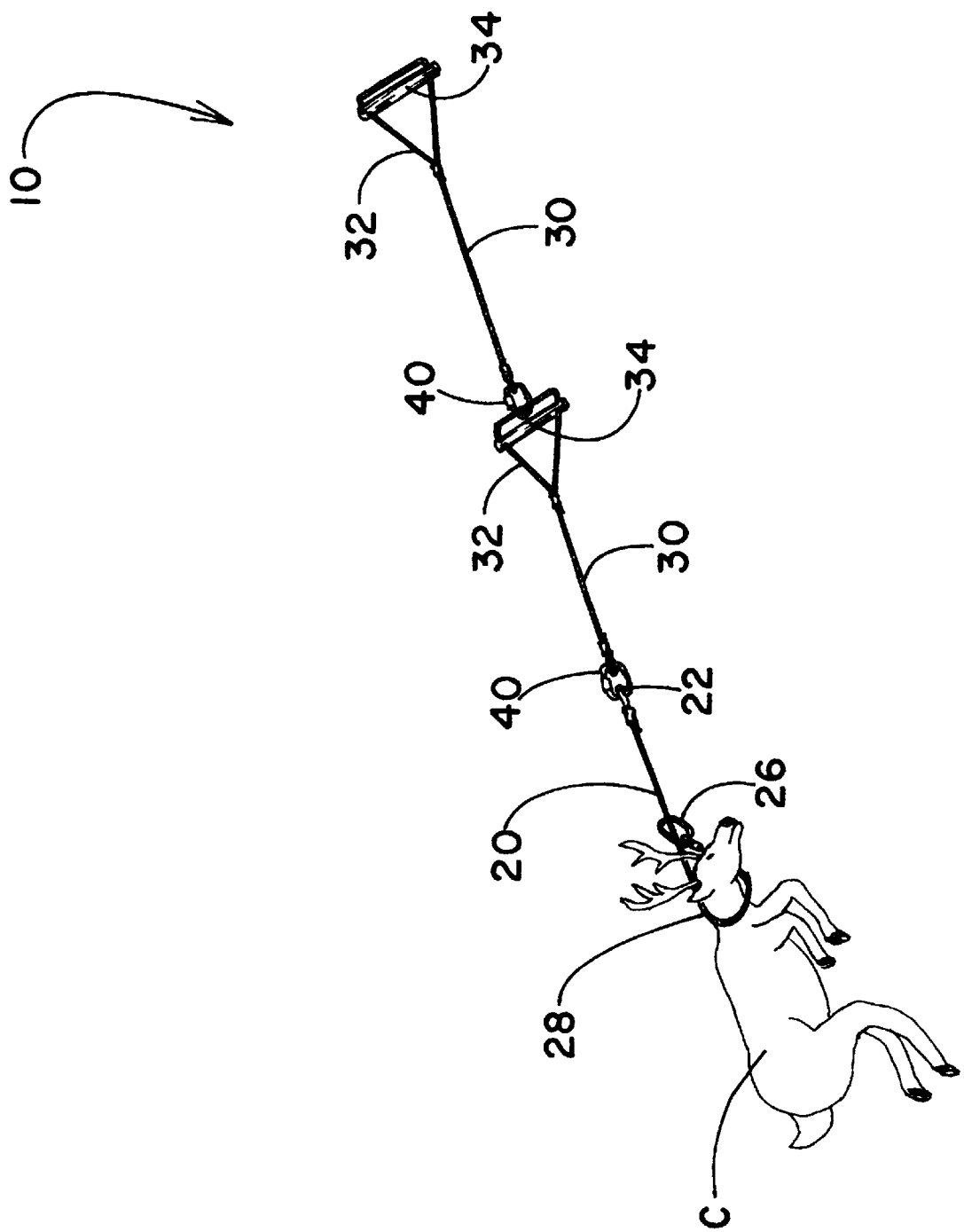
FIG. 4 is the game drag assembly reconfigured for extended length.

In addition, the quick link connector member 40 feature of the handle member 30 allows the game drag assembly 10 to be reconfigured to provide a drag assembly of greater length. The quick link connector member 40 of a first handle section member 30 is attached to the handle loop member 32 of a second handle member 30 and the quick link connector member 40 of the second handle member 30 is fastened to the first connecting loop end 22 of the game engaging section 20, as seen in FIG. 4. Any number of handle section members 30 may be connected in series to lengthen the game drag assembly 10 to a desired degree. The linear configuration of the game drag assembly 10 shown in FIG. 4 allows two (or more) hunters to walk single file while dragging a slain animal carcass C.

The game drag assembly 10 of the present invention provides many advantages over presently available devices for the same purpose. The components of the assembly 10 are easily disconnected from each other, and can be stored in a small, flat pouch for easy transport. A hunter can easily carry the packaged game drag assembly 10 during the hunt, making the assembly conveniently available at all times. Further, the game drag assembly is compact, light in weight, highly durable, and does not represent a bulky object that might interfere with a hunter pursuing a game animal.

While the invention has been particularly shown and described with reference to a preferred embodiment thereof, it will be understood by those skilled in the art that various changes in form and details may be made therein without departing from the spirit and scope of the invention.

I claim:

1. An adjustable game drag assembly for transporting a slain game animal comprising:

a) a game engaging section member comprising a linear rope-like member having a first connecting loop end and a second snap link loop end for fastening about the slain game animal; and b) a plurality of handle section members, each handle section member comprising a linear rope-like member having a first handle loop end, said handle loop end containing a rigid hand hold member contained therein, said handle section member each having a second end with a reversible attachment member secured thereto, each handle section member reversible attachment member fastened to said connecting loop end of said game engaging section member, whereby fastening said game engaging section member about the slain game animal by means of said second snap link loop end provides rigid hand hold members contained in said attached handle loop ends for assisting in transporting the slain game animal across terrain.

2. An adjustable game drag assembly according to claim 1 wherein, said linear rope-like member of said game engaging section member and of said handle section members comprises steel cable.

3. An adjustable game drag assembly according to claim 2 wherein, said game engaging section member connecting loop end and said snap link loop end are secured by cable ferrule fastener members.

4. An adjustable game drag assembly according to claim 2 wherein, said handle section member first handle loop end and said handle section member reversible attachment member are secured by cable ferrule fastener members.

5. An adjustable game drag assembly according to claim 1 wherein, said rigid hand hold member comprises a cylindrical wood dowel.

6. An adjustable game drag assembly according to claim 5 wherein, said cylindrical wood dowel contains two apertures with said first handle loop end threaded through each aperture.

7. An adjustable game drag assembly according to claim 1 wherein, said handle section member reversible attachment member comprises a threaded quick link fastener member.

8. An adjustable game drag assembly for transporting a slain game animal comprising:

a) a game engaging section member comprising a linear rope-like member having a first connecting loop end and a second snap link loop end for fastening about the slain game animal, and b) a plurality of handle section members, each handle section member comprising a linear rope-like member having a first handle loop end, said handle loop end containing a rigid hand hold member contained therein, said handle section member each having a second end with a reversible attachment member secured thereto, a first handle section member reversible attachment member fastened to said connecting loop end of said game engaging section member, and a second handle section member reversible attachment member fastened to said first handle loop end of said first handle section member, whereby fastening said game engaging section member about the slain game animal by means of said second snap link loop end provides rigid hand hold members contained in said attached handle loop ends for assisting in transporting the slain game animal across terrain.

9. An adjustable game drag assembly according to claim 8 wherein, said linear rope-like member of said game engaging section member and of said handle section members comprises steel cable.

10. An adjustable game drag assembly according to claim 9 wherein, said game engaging section member connecting loop end and said snap link loop end are secured by cable ferrule fastener members.

11. An adjustable game drag assembly according to claim 9 wherein, said handle section member first handle loop end and said handle section member reversible attachment member are secured by cable ferrule fastener members.

12. An adjustable game drag assembly according to claim 8 wherein, said rigid hand hold member comprises a cylindrical wood dowel.

13. An adjustable game drag assembly according to claim 12 wherein, said cylindrical wood dowel contains two apertures with said first handle loop end threaded through each aperture.

14. An adjustable game drag assembly according to claim 8 wherein, said handle section member reversible attachment member comprises a threaded quick link fastener member.

15. An adjustable game drag assembly for transporting a slain game animal comprising:

a) a game engaging section member comprising a linear steel cable member having a first connecting loop end and a second snap link loop end for fastening about the slain game animal, and b) a plurality of handle section members, each handle section member comprising a linear steel cable member having a first handle loop end, said handle loop end containing a cylindrical wood dowel member contained therein, said handle section member each having a second end with a threaded quick link fastener member secured thereto, each handle section member threaded quick link fastener member fastened to said connecting loop end of said game engaging section member, whereby fastening said game engaging section member about the slain game animal by means of said second snap link loop end provides cylindrical wood dowel hand hold members contained in said attached handle loop ends for assisting in transporting the slain game animal across terrain.

16. An adjustable game drag assembly according to claim 15 wherein, said game engaging section member connecting loop end and said snap link loop end are secured by cable ferrule fastener members.

17. An adjustable game drag assembly according to claim 15 wherein, said handle section member first handle loop end and said handle section member threaded quick link fastener member are secured by cable ferrule fastener members.

18. An adjustable game drag assembly according to claim 15 wherein, said cylindrical wood dowel contains two apertures with said first handle loop end threaded through each aperture.

* * * * *